US012651367B2

(12) United States Patent
Luo et al.

(10) Patent No.: US 12,651,367 B2
(45) Date of Patent: Jun. 9, 2026

(54) WORK MACHINE MANAGEMENT SYSTEM AND WORK MACHINE

(71) Applicant: SUMITOMO HEAVY INDUSTRIES, LTD., Tokyo (JP)

(72) Inventors: Zihan Luo, Yokosuka (JP); Mizuki Kogawa, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 318 days.

(21) Appl. No.: 18/401,719

(22) Filed: Jan. 2, 2024

(65) Prior Publication Data

US 2024/0242370 A1 Jul. 18, 2024

(30) Foreign Application Priority Data

Jan. 16, 2023 (JP) ................................. 2023-004337

(51) Int. Cl.
| | |
|---|---|
| *E02F 9/08* | (2006.01) |
| *E02F 9/26* | (2006.01) |
| *G06T 7/00* | (2017.01) |
| *G06T 7/70* | (2017.01) |
| *H04N 7/18* | (2006.01) |

(52) U.S. Cl.
CPC .................. *G06T 7/70* (2017.01); *E02F 9/26* (2013.01); *G06T 7/0002* (2013.01); *H04N 7/183* (2013.01); *G06T 2207/10016* (2013.01); *G06T 2207/20084* (2013.01); *G06T 2207/30196* (2013.01); *G06T 2207/30268* (2013.01)

(58) Field of Classification Search
CPC .................... G06T 7/70; G06T 7/0002; G06T 2207/10016; G06T 2207/20084; G06T 2207/30196; G06T 2207/30268; E02F 9/26; E02F 9/0858; E02F 9/0833; E02F 3/28; E02F 9/00; E02F 9/16; H04N 7/183; G06Q 10/063; G06V 20/597; G06V 40/20

See application file for complete search history.

(56) References Cited

U.S. PATENT DOCUMENTS

| | | | | |
|---|---|---|---|---|
| 11,420,518 | B2 * | 8/2022 | Hwang | ................... B60K 35/22 |
| 2020/0024821 | A1 * | 1/2020 | Takeuchi | .................. E02F 3/43 |
| 2022/0309795 | A1 * | 9/2022 | Jakobsen | ................ E02F 9/205 |
| 2022/0316179 | A1 | 10/2022 | Katoh et al. | |
| 2023/0001930 | A1 * | 1/2023 | Moidunny | ............ A61B 5/1116 |
| 2024/0176933 | A1 * | 5/2024 | Xiao | ........................ G06T 17/00 |

FOREIGN PATENT DOCUMENTS

| | | | |
|---|---|---|---|
| JP | 2022-085194 A | 6/2022 | |
| WO | WO-2022103002 A1 * | 5/2022 | ............ G01B 21/22 |

OTHER PUBLICATIONS

European Search Report of EP Application No. 23217893.9 Mailed on Jun. 25, 2024.

* cited by examiner

*Primary Examiner* — Shefali D Goradia
(74) *Attorney, Agent, or Firm* — WTA IP Law P.C.

(57) ABSTRACT

A work machine management system includes an acquisition unit configured to acquire posture information indicating a posture of a driver of a work machine when boarding and alighting, a transmission unit configured to transmit the posture information to an outside of the work machine, and a determination unit configured to determine appropriateness of the posture when boarding and alighting based on the received posture information.

3 Claims, 8 Drawing Sheets

101     OP     106     10

START

IMAGE — S1

TRANSMIT POSTURE INFORMATION — S3

END

START

T1 — IS POSTURE INFORMATION RECEIVED?          NO

YES

EXTRACT PORTION CORRESPONDING TO OPERATOR — T3

DETECT SKELETON — T5

DETERMINE POSTURE — T7

T9 — IS POSTURE APPROPRIATE?          NO

YES

NOTIFICATION PROCESSING — T11

END

WORK MACHINE MANAGEMENT SYSTEM AND WORK MACHINE

CROSS-REFERENCE TO RELATED APPLICATIONS

This application claims priority to Japanese Patent Application No. 2023-004337, filed on Jan. 16, 2023, which is incorporated by reference herein in its entirety.

BACKGROUND

Technical Field

Certain embodiments of the present invention relate to a work machine management system and a work machine.

Description of Related Art

In order to allow a driver of a work machine to board and alight properly, conventionally, a step-shaped elevating device leading to a driving seat has been mounted (for example, refer to the related art).

SUMMARY

However, the elevating device may cause an increase in size, complexity, weight, manufacturing cost, and the like of a work machine.

It is desirable to suppress addition of configurations and to make boarding and alighting of a driver of a work machine appropriate.

A work machine management system according to an embodiment of the present invention includes an acquisition unit configured to acquire posture information indicating a posture of a driver of a work machine when boarding and alighting, a transmission unit configured to transmit the posture information to an outside of the work machine, and a determination unit configured to determine appropriateness of the posture when boarding and alighting based on the received posture information.

Further, a work machine according to an embodiment of the present invention includes an acquisition unit configured to acquire posture information indicating a posture of a driver of the work machine when boarding and alighting, a determination unit configured to determine appropriateness of the posture when boarding and alighting based on the received posture information, and a notification processing unit configured to perform notification processing.

DETAILED DESCRIPTION

According to the present invention, it is possible to suppress addition of configurations and to make boarding and alighting of the driver of the work machine appropriate.

One Embodiment

Hereinafter, one embodiment of the present invention will be described in detail with reference to the drawings.

In the present embodiment, a management system of an excavator as a work machine will be exemplified.

Figure 1:
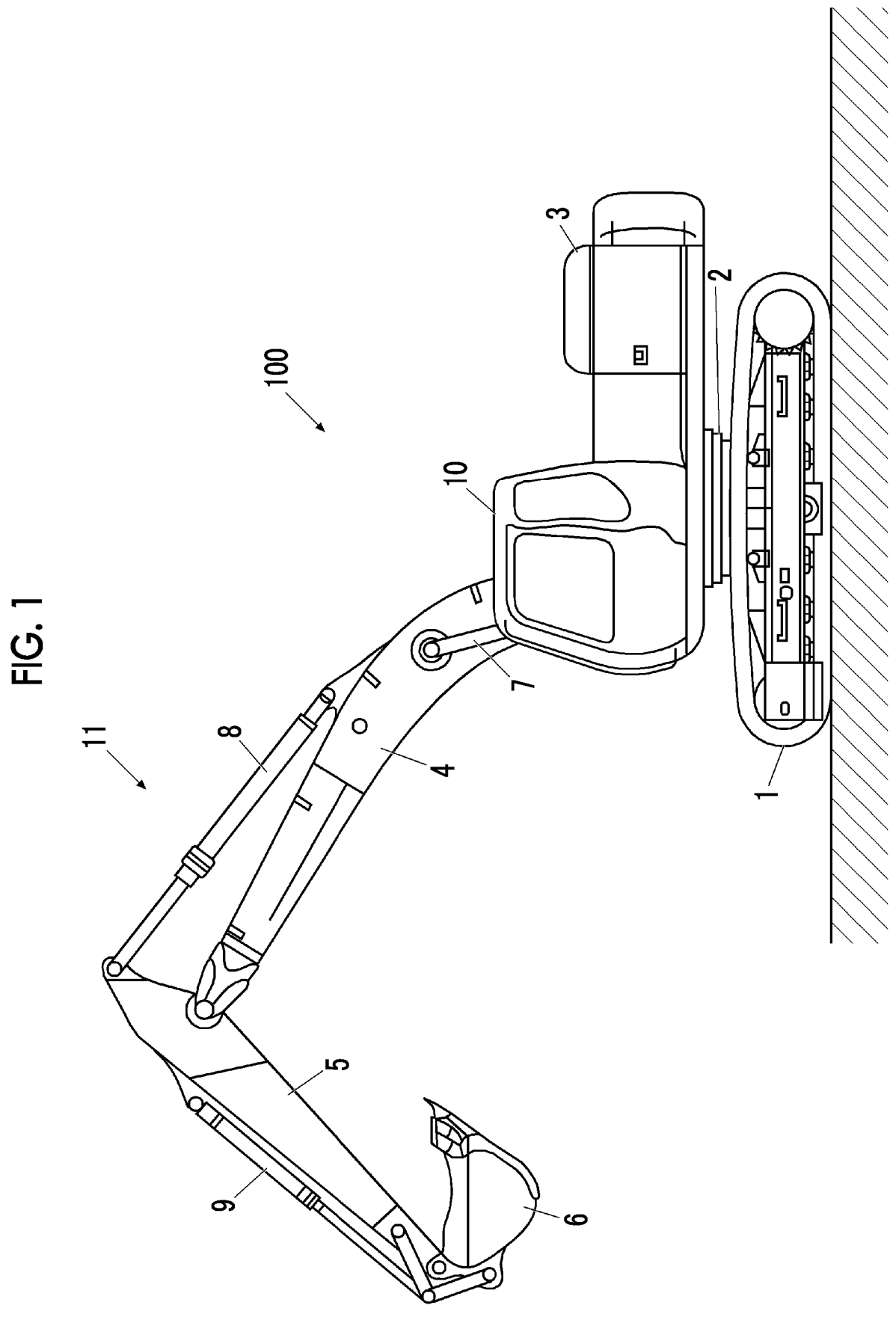
FIG. 1 is a side view of an excavator of a management system according to one embodiment.
Figure 2:
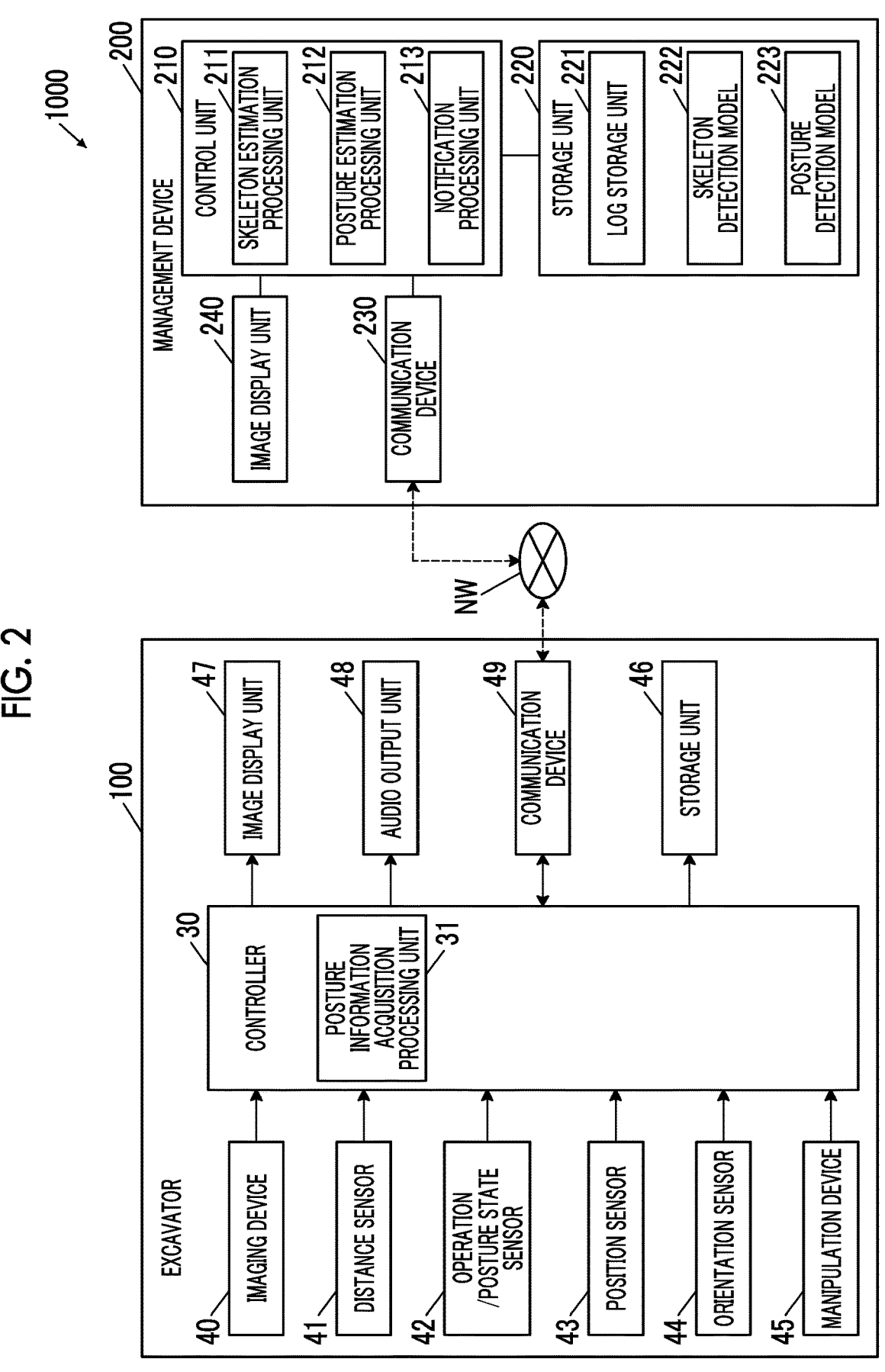
FIG. 2 is a block diagram showing a schematic configuration of the excavator management system.

FIG. 1 is a side view of an excavator 100, and FIG. 2 is a block diagram showing a schematic configuration of an excavator management system 1000.

As shown in this diagram, the excavator management system 1000 is configured of the excavator 100 and a management device 200 that can communicate with each other through a network NW.

The above-described management system 1000 may include a plurality of excavators 100.

Excavator Configuration

As shown in FIG. 1, the excavator 100 includes a lower traveling body 1; a rotating platform 3 that is turnably mounted on the lower traveling body 1 via a turning mechanism 2; a boom 4, an arm 5, and a bucket 6 as an attachment 11; and a cabin 10 as a driving seat that an operator OP as a driver boards. The attachment 11 is not limited thereto as long as a work element (for example, bucket, crusher, or crane device) is provided.

The lower traveling body 1 includes, for example, a pair of right and left crawlers, and each crawler is hydraulically driven by a traveling hydraulic motor (not shown) to cause the excavator 100 to travel.

The rotating platform 3 is driven by a turning hydraulic motor, an electric motor (both not shown), or the like to turn with respect to the lower traveling body 1.

The boom 4 is pivotally attached to a center of a front portion of the rotating platform 3 so as to be capable of being elevated, the arm 5 is pivotally attached to a tip of the boom 4 so as to be capable of rotating up and down, and the bucket 6 is pivotally attached to a tip of the arm 5 so as to be capable of rotating up and down. The boom 4, the arm 5, and the bucket 6 are hydraulically driven by a boom cylinder 7, an arm cylinder 8, and a bucket cylinder 9, respectively.

The cabin 10 is a cab that the operator boards, and is mounted on, for example, a left side of the front portion of the rotating platform 3. The excavator 100 causes an actuator to operate in response to a manipulation of the operator boarding the cabin 10 to drive driven elements such as the lower traveling body 1, the rotating platform 3, the boom 4, the arm 5, and the bucket 6.

As shown in FIG. 1, in addition to the above-described configuration, the excavator 100 includes an imaging device 40, a distance sensor 41, an operation/posture state sensor 42, a position sensor 43, an orientation sensor 44, a manipulation device 45, an image display unit 47, an audio output unit 48, a communication device 49, a controller 30, and a storage unit 46.

The distance sensor 41 is a distance measurement unit that measures a distance to an object near the excavator 100 and acquires information of the distance (two-dimensional or three-dimensional distance information), and outputs the acquired information to the controller 30. For example, the distance sensor 41 is provided such that four sides of a front side, a rear side, a right side, and a left side of the excavator 100 can be measured.

The operation/posture state sensor 42 is a sensor that detects an operation state or a posture state of the excavator 100, and outputs a detection result to the controller 30. The operation/posture state sensor 42 includes a boom angle sensor, an arm angle sensor, a bucket angle sensor, a triaxial inertial measurement unit (IMU), a turning angle sensor, and an acceleration sensor.

These sensors may be configured of a stroke sensor for a cylinder such as a boom, or a sensor such as a rotary encoder for acquiring rotation information, or may be replaced by acceleration (which may include speed and position) acquired by the IMU.

The boom angle sensor detects a rotation angle of the boom 4 (hereinafter, referred to as a "boom angle") with reference to a predetermined angle with respect to the rotating platform 3.

The arm angle sensor detects a rotation angle of the arm 5 (hereinafter referred to as "arm angle") with respect to the boom 4.

The bucket angle sensor detects a rotation angle of the bucket 6 (hereinafter referred to as "bucket angle") with respect to the arm 5.

The IMU is attached to each of the boom 4 and the arm 5, and to the rotating platform 3 (a location other than the attachment 11). The IMU detects the acceleration of the boom 4, the arm 5, and the rotating platform 3 along predetermined three axes and angular acceleration of the boom 4, the arm 5, and the rotating platform 3 around the predetermined three axes. In addition, the IMU provided in the rotating platform 3 detects an inclination angle of the rotating platform 3 with respect to an absolute horizontal plane.

The turning angle sensor detects a turning angle with respect to a predetermined angular direction of the rotating platform 3. However, the present invention is not limited thereto, and the turning angle may be detected based on a GPS or an IMU sensor provided in the rotating platform 3.

The acceleration sensor is attached to a position away from a turning axis of the rotating platform 3 to detect the acceleration of the rotating platform 3 at that position. Accordingly, whether the rotating platform 3 turns, whether the lower traveling body 1 travels, or the like can be determined based on a detection result of the acceleration sensor.

The position sensor 43 functions as a position information acquisition unit that acquires position information of the work machine, and is equipped on, for example, the rotating platform 3.

The position sensor 43 is a sensor that acquires information on a position (current position) of the excavator 100, and is a Global Navigation Satellite System (GNSS) receiver in the present embodiment. The position sensor 43 receives a signal including the information on the position of the excavator 100 from a GNSS satellite, and outputs the acquired position information of the excavator 100 to the controller 30. The position sensor 43 may not be the GNSS receiver as long as the position information of the excavator 100 can be acquired, and may be, for example, a sensor that uses a satellite positioning system other than the GNSS. Further, the position sensor 43 may be provided on the lower traveling body 1.

The orientation sensor 44 is a sensor that is provided on the rotating platform 3 and acquires information on an orientation (direction) in which the rotating platform 3 faces, and is, for example, a geomagnetic sensor. The orientation sensor 44 acquires the orientation information of the rotating platform 3 and outputs the orientation information to the controller 30. The orientation sensor 44 need only be capable of acquiring the orientation information of the rotating platform 3, and a sensor type thereof or the like is not particularly limited. For example, two GNSS receivers may be provided, and the orientation information may be acquired from a difference in pieces of position information of the two GNSS receivers.

The storage unit 46 is a storage unit such as a non-volatile memory, a hard disk drive (HDD), or a solid state drive (SSD) that stores information such as various types of data in a writable and readable manner.

The communication device 49 is a communication device that transmits and receives various types of information to and from the management device 200, which is a remote external device, another excavator 100, or the like through a predetermined communication network NW, based on a predetermined wireless communication standard. The communication network NW may include, for example, a mobile communication network with a base station as a terminal, a satellite communication network that uses a communication satellite in the sky, a short-range communication network that conforms to a protocol such as Wi-Fi or Bluetooth (registered trademark), and an Internet communication network.

The controller 30 is a control device that controls the operation of each part of the excavator 100 to control the drive of the excavator 100. The controller 30 is mounted inside the cabin 10. The function of the controller 30 may be realized by any hardware, software, or a combination thereof. For example, the controller 30 is mainly configured of a microcomputer including a CPU, a RAM, a ROM, an I/O, and the like. In addition to these, the controller 30 may be configured to include, for example, an FPGA or an ASIC.

Further, the controller 30 includes a storage area defined in an internal memory such as an electrically erasable programmable read-only memory (EEPROM).

The storage area stores various programs, various types of data, or the like, which includes image processing, for operating each part of the excavator 100, and also functions as a work area of the controller 30.

Further, the controller 30 of the excavator 100 can mutually communicate with an external management device 200 through the communication device 49 and the predetermined communication network NW. The controller 30 can transmit various types of data to the management device 200 by communication.

In addition, as shown in FIG. 2, the controller 30 includes a posture information acquisition processing unit 31 or the like as a functional block. The posture information acquisition processing unit 31 has a functional configuration realized by the controller 30 executing various programs, but may be realized by hardware.

Figure 3:
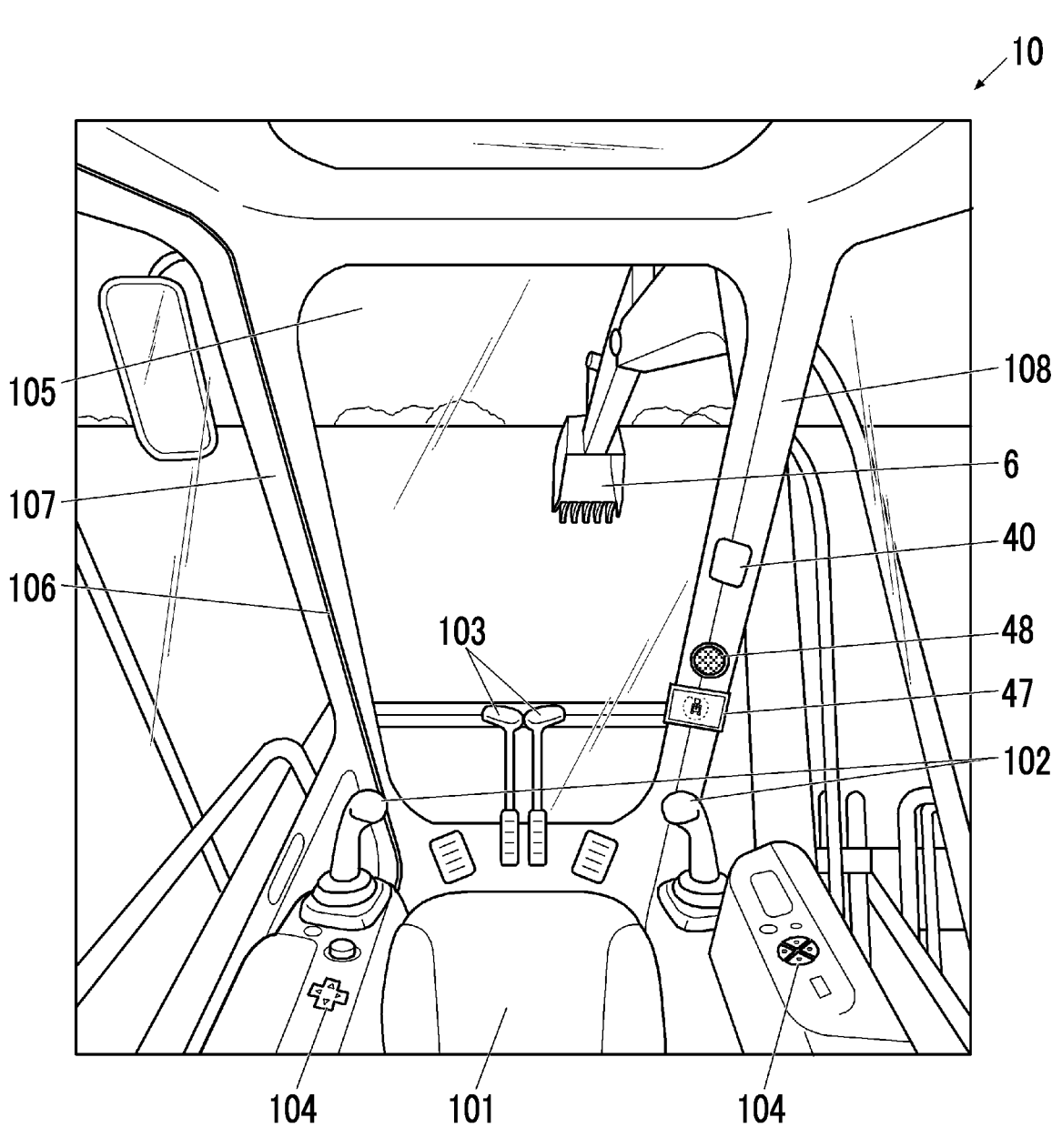
FIG. 3 is a view of an inside of a cabin as viewed forward from a driving seat.

FIG. 3 is a view of an inside of the cabin 10 viewed forward from a driving seat 101.

The driving seat 101 is installed in the cabin 10. Operation levers 102 are attached to both right and left sides of the driving seat 101, pedals 103 are attached to a front side of the driving seat 101, and various operation switches 104 or the like are attached to rear of each operation lever 102. These configure the manipulation device 45.

The manipulation devices 45 are manipulation units for the operator to manipulate each operating element (lower traveling body 1, rotating platform 3, boom 4, arm 5, bucket 6, or the like). In other words, the manipulation device 45 is a manipulation unit that manipulates each hydraulic actuator for driving each operating element, and outputs a manipulation signal corresponding to the manipulation content to the controller 30.

Further, the manipulation device 45 is also a manipulation unit that manipulates the imaging device 40, the distance sensor 41, the operation/posture state sensor 42, the position sensor 43, the image display unit 47, the audio output unit 48, the communication device 49, and the like, and outputs a manipulation command for each of these parts to the controller 30.

A windshield 105 is located at the front of the driving seat 101. On a left side of the windshield 105, there is a boarding/alighting entrance 106 for the operator OP, and a door 107 that can be opened and closed is attached.

An image display unit 47 is attached to a lower portion of a pillar 108 on a right side of the windshield 105.

The image display unit 47 displays, under the control of the controller 30, various types of image information to be notified to the operator OP. The image display unit 47 is, for example, a liquid crystal display or an organic electroluminescence (EL) display, and may be a touch-panel type that also serves as at least a part of the manipulation device 45.

Further, in the pillar 108 on the right side, the audio output unit 48 is provided above the image display unit 47. The audio output unit 48 outputs, under the control of the controller 30, various types of audio information to be notified to the operator. The audio output unit 48 is, for example, a speaker or a buzzer.

In addition, an imaging device 40 for imaging the inside of the cabin 10 and the boarding/alighting entrance 106 is attached to an upper portion of the pillar 108 on the right side.

The imaging device 40 is adjusted and fixed such that a visual line thereof is in a suitable direction for imaging the operator OP when boarding and alighting from the cabin 10 and when the driving seat 101 is seated.

An imaging device for imaging the operator OP when boarding and alighting from the cabin 10 and an imaging device for imaging the operator OP when the driving seat 101 is seated may be separately prepared and provided in the cabin 10 in a disposition suitable for each imaging.

In addition, in order to assist driving or to record work, imaging devices that image the front side, the right side, the left side, and the rear side of the excavator 100 may be separately provided.

Posture Information Acquisition Processing Unit

Figure 4:
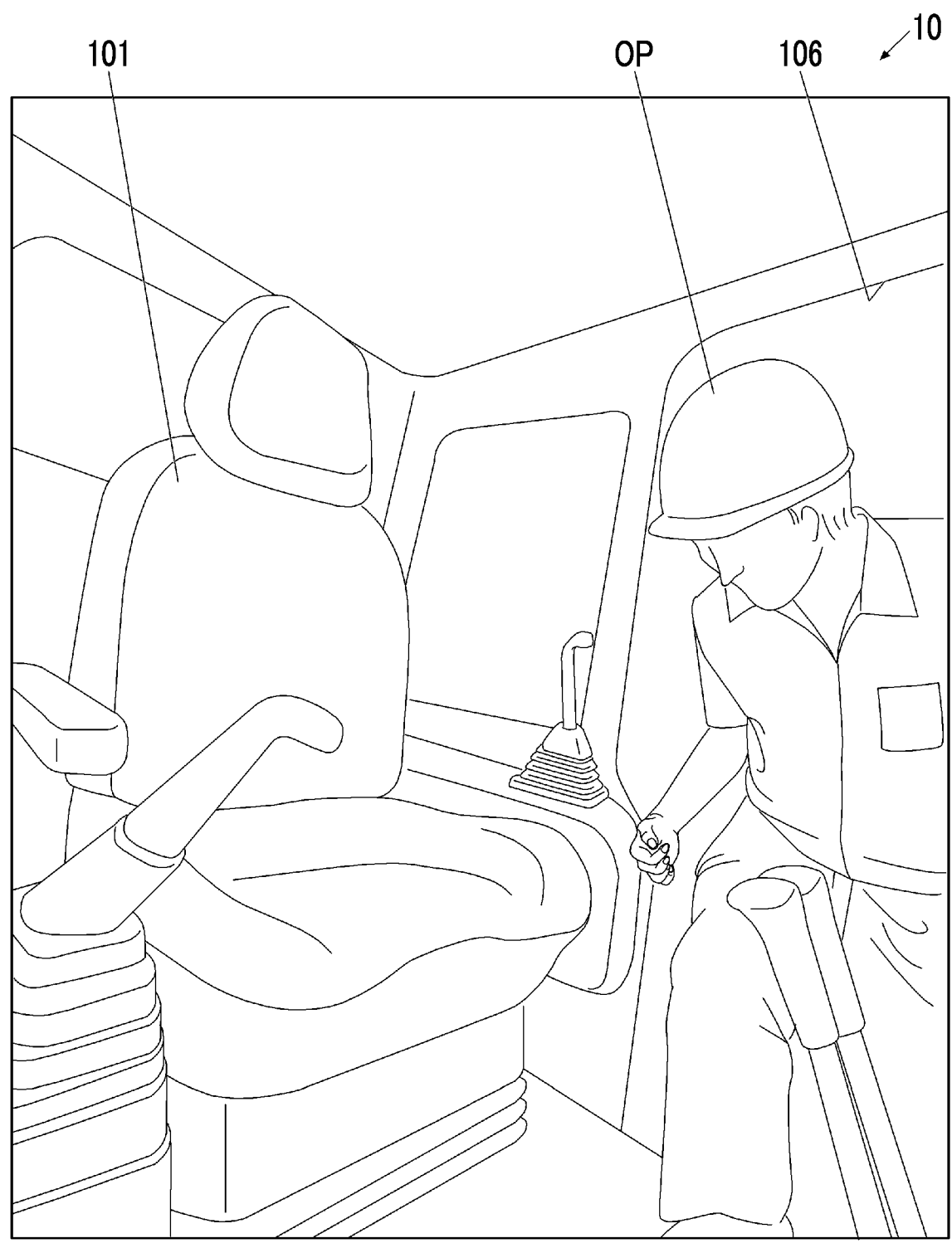
FIG. 4 shows an image for one frame obtained by capturing an image of an operator boarding and alighting.

FIG. 4 shows one frame of captured image data obtained by capturing a video of the operator OP boarding and alighting through the boarding/alighting entrance 106 with the imaging device 40 of the excavator 100.

The posture information acquisition processing unit 31 of the excavator 100 acquires the captured image data on the inside of the cabin 10 and the boarding/alighting entrance 106 with the imaging device 40 as an acquisition unit. Then, the posture information acquisition processing unit 31 as a transmission unit transmits the captured image data as posture information, which indicates a posture of the operator OP when boarding and alighting, to the management device 200 through the communication device 49. The captured image data is video data, and is composed of a collection of image data in which a plurality of images in one frame as shown in FIG. 4 are continuously connected over time. A plurality of frames of the captured image data indicate a change over time in a state of the operator OP when boarding and alighting.

The posture information acquisition processing unit 31 may continuously capture images with the imaging device 40 in a set time zone and transmit captured image data, or may determine start and end of imaging and data transmission with a predetermined trigger.

For example, the posture information acquisition processing unit 31 may start imaging and further data transmission by using an opening operation of the door 107 as a trigger. Similarly, the imaging and further data transmission may be ended by a closing operation of the opened door 107 as a trigger. In this case, the opening and closing of the door 107 may be detected by a sensor such as a microswitch.

Management Device

The management device 200 is disposed at a position geographically separated from the excavator 100 and is used by, for example, a supervisor. The management device 200 is, for example, a server device that is installed in a management center or the like provided outside a work site where the excavator 100 works and is mainly configured of one or a plurality of server computers or the like. In this case, the server device may be an in-house server of a business operator or the like that operates a system constructed by the excavator(s) 100 as well, or may be a rental server. Further, the server device may be a so-called cloud server. Further, the management device 200 may be a server device (so-called edge server) disposed in a management office or the like in the work site of the excavator 100, or may be a stationary or portable general-purpose computer terminal.

As shown in FIG. 2, the management device 200 includes a control unit 210, a storage unit 220, a communication device 230, and an image display unit 240.

The communication device 230 is a communication device that transmits and receives various types of information to and from the excavator 100 through a predetermined communication network NW, based on a predetermined wireless communication standard. The communication device 230 also allows the management device 200 to perform predetermined processing in cooperation with the controller 30 of the excavator 100.

The image display unit 240 displays various types of image information to be notified to the supervisor who uses the management device 200. The image display unit 240 is, for example, a liquid crystal display or an organic EL display, and may be a touch-panel type that also functions as a manipulation device. In addition, a manipulation device may be provided separately from the image display unit 240.

The storage unit 220 has a log storage unit 221, a skeleton detection model 222, and a posture detection model 223.

The log storage unit 221 is a storage area for a log relating to the excavator 100.

For example, a log includes a unique identifier for identifying the excavator 100, a name of the operator OP, an operation record when executing various operations of the excavator 100, detection information from various sensors owned by the excavator 100, and a time when the log is recorded, a current position of the excavator 100, and the like. A part or all of this information is acquired from the excavator 100 via the communication device 230.

In addition, a result of determining appropriateness of the posture of the operator OP of the excavator 100 when boarding and alighting, which will be described later, is also recorded as a log.

The skeleton detection model 222 is a machine learning model for outputting a skeleton from the captured image data of the operator OP boarding and alighting from the cabin 10 acquired from the excavator 100 in processing of determining the appropriateness of the posture of the operator OP of the excavator 100 when boarding and alighting, which will be described later.

The posture detection model 223 is a machine learning model for outputting the posture from the skeleton of the operator OP in processing of determining the appropriateness of the posture of the operator OP of the excavator 100 when boarding and alighting, which will be described later.

For example, the control unit 210 is mainly configured of a microcomputer including a CPU, a RAM, a ROM, an I/O, and the like. In addition to these, the control unit 210 may be configured to include, for example, an FPGA or an ASIC.

The control unit 210 includes a skeleton estimation processing unit 211, a posture estimation processing unit 212, a notification processing unit 213, and the like. These are functional configurations realized by the control unit 210 executing various programs, but may be realized by hardware.

The above-described skeleton estimation processing unit 211 and the above-described posture estimation processing unit 212 configure a determination unit for determining the appropriateness of the posture of the operator OP of the excavator 100 when boarding and alighting.

Skeleton Estimation Processing Unit

The skeleton estimation processing unit 211 detects the skeleton of the operator OP that boards and alights from the cabin 10 in an estimated manner based on the captured image data received from the posture information acquisition processing unit 31 of the excavator 100.

The skeleton estimation processing unit 211 sequentially extracts a portion corresponding to the operator OP from the images of a plurality of frames of the captured image data. The portion corresponding to the operator OP can be extracted by comparison with an image of the inside of the cabin 10 and the boarding/alighting entrance 106 in a state where the operator OP does not exist.

Figure 5:
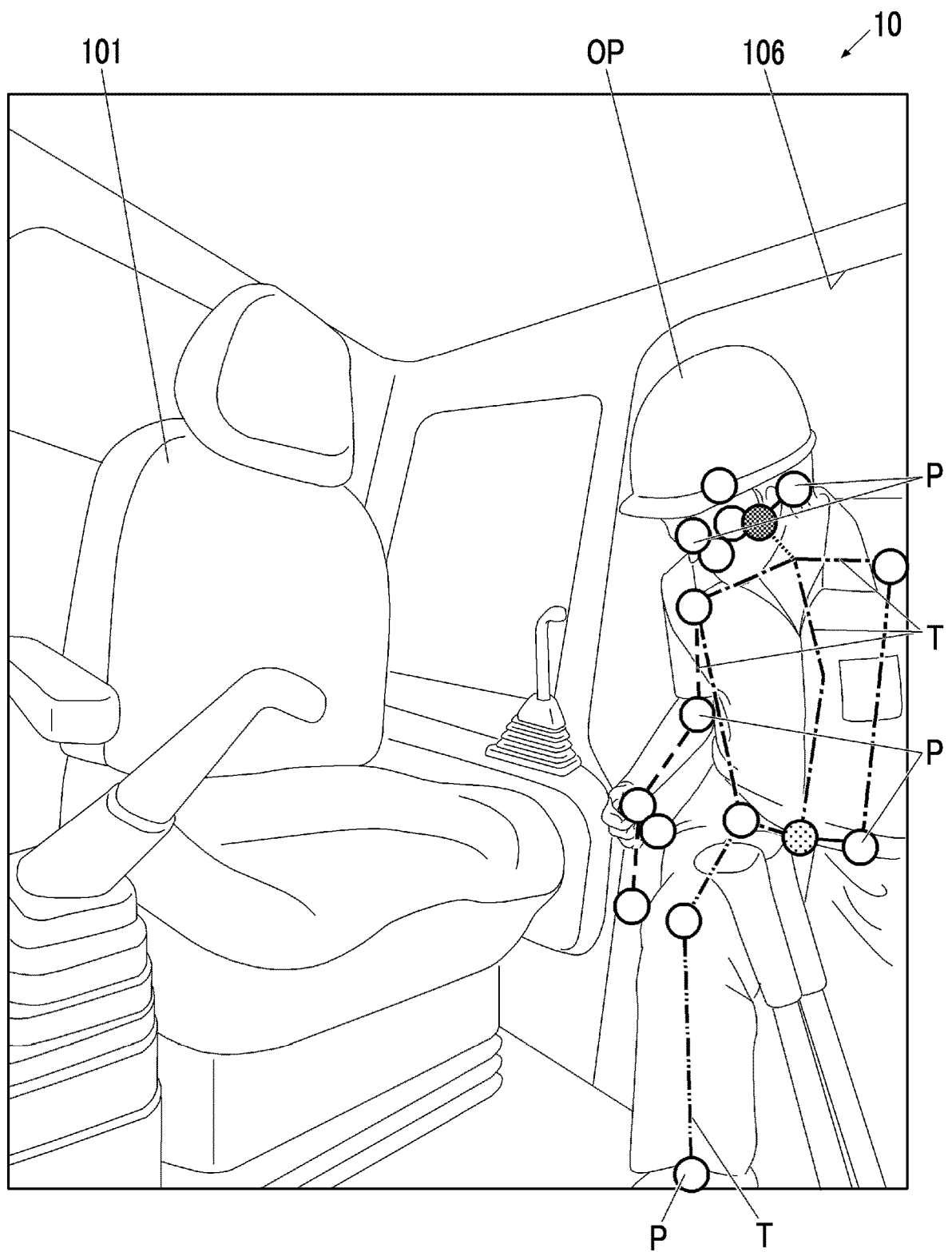
FIG. 5 is an explanatory diagram that visually represents a skeleton of the operator detected from the image of FIG. 4.

Then, the skeleton estimation processing unit 211 detects the skeleton of the operator OP by inputting the portion corresponding to the operator OP into the skeleton detection model 222. FIG. 5 is an explanatory diagram that visually represents the skeleton of the operator OP detected from the image data of one frame of FIG. 4 described above.

When the portion of the image data of one frame corresponding to the operator OP is input, the skeleton detection model 222 detects a plurality of detection points P corresponding to each part of a body of the operator OP, and outputs positions of the detection points P in coordinates. It is preferable that an algorithm of a deep neural network is applied to detection logic of the skeleton detection model 222.

The plurality of detection points P of the operator OP are, for example, a facial part, each body joint, and the like. However, the detection point P is not limited thereto.

Further, a part T connecting two detection points P from among the plurality of detection points P may be specified.

The skeleton estimation processing unit 211 inputs position coordinates of each detection point P of the operator OP to the posture estimation processing unit 212 as the estimated skeleton data. When specifying the part T, information such as a direction and a length of each part T may also be included in estimated skeleton data.

Posture Estimation Processing Unit

The posture estimation processing unit 212 of the management device 200 determines the posture based on the estimated skeleton data input from the skeleton estimation processing unit 211. The posture estimation processing unit 212 inputs the estimated skeleton data of image data of the latest frame into the posture detection model 223.

The posture detection model 223 outputs a determination result of the posture of the operator OP by inputting a plurality of detection points P of the estimated skeleton data for each frame of the image data.

That is, when a plurality of detection points P of the estimated skeleton data are input by the posture estimation processing unit 212, the posture detection model 223 determines whether or not the posture corresponds to any one of a plurality of postures that are considered to be appropriate postures, based on the plurality of detection points P. It is preferable to apply an algorithm of a deep neural network to determination logic of the posture detection model 223.

The "appropriate posture" determined by the posture detection model 223 is, for example, a posture in which the operator OP who boards and alights is supporting the body with three or more of the four limbs (so-called three-point support), and a posture in which a direction of the body is directed toward the inside of the cabin 10, a posture in which a handrail provided in the cabin 10 is grasped, and the like.

The posture detection model 223 may determine whether or not the posture corresponds to any one of a plurality of postures that are considered to be inappropriate postures, based on the plurality of detection points P. In this case, the "inappropriate posture" is a posture contrary to each example of the "appropriate posture" described above. That is, a posture in which the body is supported by two or less limbs (two-point support), a posture in which the direction of the body is directed toward an outside of the cabin 10, a posture in which the handrail is not grasped, and the like.

When the posture corresponds to all of the "appropriate postures" defined in these or when the posture corresponds to none of the "inappropriate postures", the posture estimation processing unit 212 outputs a determination result that the operator OP is boarding and alighting in an appropriate posture to the notification processing unit 213.

In addition, when the posture does not correspond to any one of the "appropriate postures" defined in these, or when the posture corresponds to any one of the "inappropriate postures", the posture estimation processing unit 212 outputs a determination result that the operator OP is boarding and alighting in an inappropriate posture to the notification processing unit 213.

It should be noted that the posture estimation processing unit 212 may determine the appropriateness of the posture based on a change in the posture in image data of a plurality of continuous frames, in addition to determining only based on the image data of one frame. For example, a jumping motion when alighting from the cabin 10 is added to the "inappropriate postures", and when a change in the posture based on the image data of a plurality of frames indicates jumping, it is determined to be an "inappropriate posture".

In addition, even when determining the appropriateness from image data of each frame, when determination is continuously made for a predetermined number of times that the posture is an "inappropriate posture" for the image data of each frame, determination may be made conclusively that the posture is an "inappropriate posture".

Notification Processing Unit

When the determination result that the operator OP is boarding and alighting in an inappropriate posture is input from the posture estimation processing unit 212, the notification processing unit 213 executes notification processing.

As the notification processing, the notification processing unit 213 causes the image display unit 240 to display a notification screen indicating that the operator OP is boarding and alighting in an inappropriate posture, and notifies the supervisor. In addition, when the management device 200 includes an audio output unit, the management device 200 may output a notification sound, a notification message, or the like.

Further, as the notification processing, the notification processing unit 213 record a log, which includes occurrence of boarding and alighting in an inappropriate posture as information, into the log storage unit 221 together with the unique identifier for identifying the excavator 100, the name of the operator OP, the time when the log is recorded, the current position of the excavator 100, and the like.

When the communication between the excavator 100 and the management device 200 is fast enough and a processing capacity of the control unit 210 is high enough, the notification processing unit 213 may notify the excavator 100, as the notification processing. In that case, it is preferable that the excavator 100 includes a notification processing unit. The notification processing unit of the excavator 100 can receive a notification from the management device 200, display a notification screen on the image display unit 47, and output a notification sound or a notification message from the audio output unit 48.

Processing from Acquisition of Posture Information to Notification

Figures 6, 7:
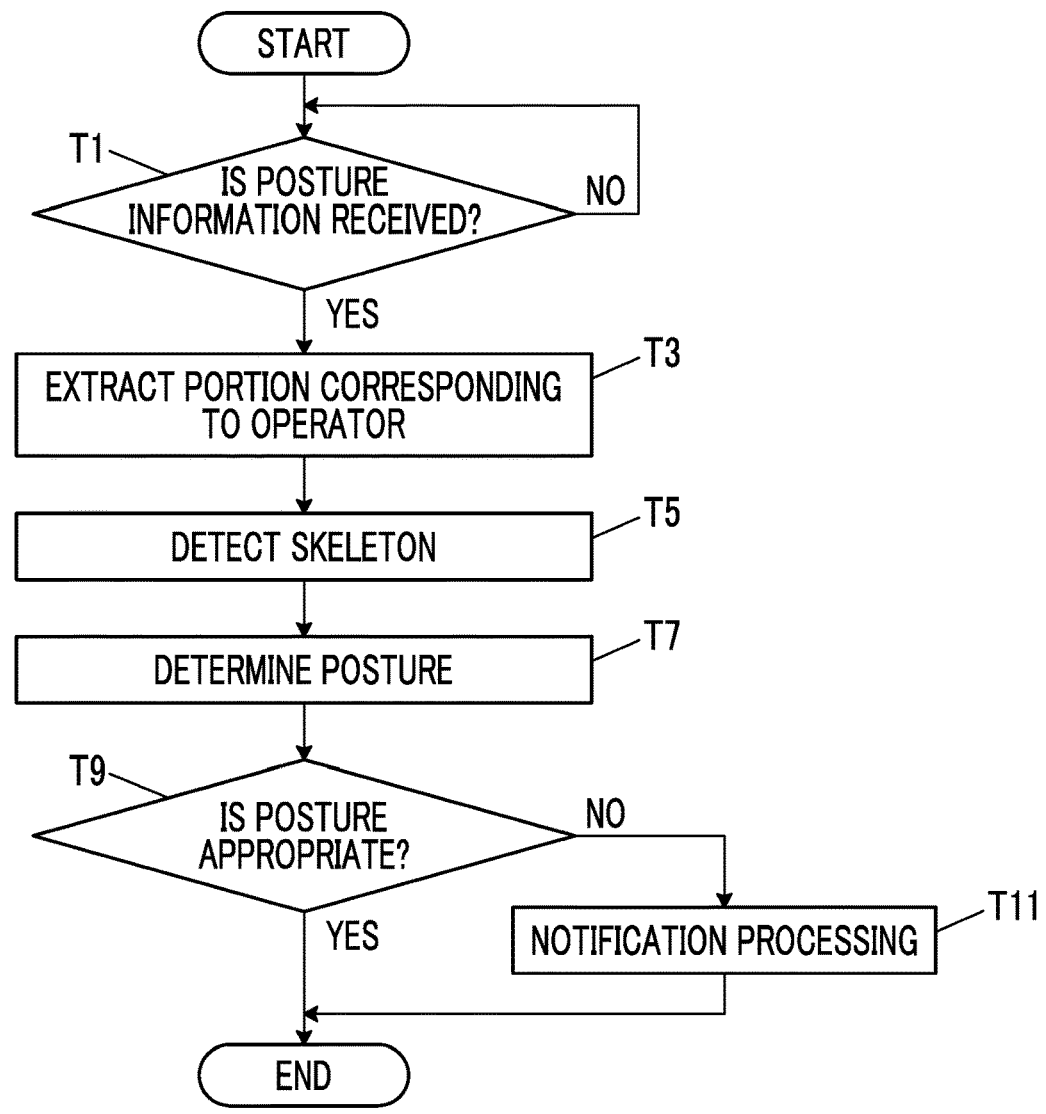
FIG. 6 is a flowchart showing processing performed by a controller of the excavator in a series of processing from acquisition of posture information to notification.
FIG. 7 is a flowchart showing processing performed by a control unit of a management device in the series of the processing from the acquisition of the posture information to the notification.

A series of processing from the acquisition of the posture information of the operator OP to the notification in the management system 1000 will be described. FIG. 6 is a flowchart showing processing performed by the controller 30 of the excavator 100 in the series of the processing from the acquisition of the posture information to the notification, and FIG. 7 is a flowchart showing the processing performed by the control unit 210 of the management device 200.

First, the posture information acquisition processing unit 31 of the excavator 100 images the operator OP boarding and alighting from the cabin 10 with the imaging device 40 (step S1).

Then, the posture information acquisition processing unit 31 transmits the captured image data obtained by imaging to the management device 200 as posture information (step S3).

On the other hand, the control unit 210 of the management device 200 determines whether or not the captured image data (posture information) is received from the controller 30 of the excavator 100 (step T1).

Then, when recognizing the reception of the captured image data (posture information), the skeleton estimation processing unit 211 extracts a portion corresponding to the operator OP for each frame of the image data (step T3).

Further, the data of the portion corresponding to the operator OP is input to the skeleton detection model 222, and the position coordinates of the plurality of detection points P of the operator OP are acquired as the estimated skeleton data (step T5). The skeleton estimation processing unit 211 inputs the estimated skeleton data to the posture estimation processing unit 212.

The posture estimation processing unit 212 inputs the estimated skeleton data to the posture detection model 223. Then, the determination result for the "appropriate posture"

by the posture detection model 223 is acquired (step T7). The posture estimation processing unit 212 inputs the determination result to the notification processing unit 213.

When a determination result indicating that the operator OP is in an "appropriate posture" is input from the posture estimation processing unit 212, the notification processing unit 213 ends the processing as it is (step T9).

In addition, when a determination result indicating that the operator OP is in an "inappropriate posture" is input from the posture estimation processing unit 212, the notification processing unit 213 executes the notification processing (step T11). That is, the notification processing unit 213 displays a notification screen on the image display unit 240, and records boarding and alighting in an "inappropriate posture" as a log in the log storage unit 221 to end the processing.

The processing performed by the control unit 210 of the management device 200 shown in FIG. 7 may be sequentially performed for each frame of the captured image data, or may be performed intermittently at intervals of a predetermined number of frames.

Technical Effects of One Embodiment

In the above-described management system 1000, the skeleton estimation processing unit 211 and the posture estimation processing unit 212 determine the appropriateness of the posture when boarding and alighting, based on the posture information of the operator OP of the excavator 100.

Accordingly, it is possible to monitor inappropriate boarding and alighting by the operator OP, which contributes to prevention and suppression thereof.

Therefore, it is not necessary to install an elevating device on the excavator 100, and it is possible to suppress an increase in size, complexity, weight, manufacturing cost, and the like of the excavator 100, and make boarding and alighting appropriate.

Furthermore, since the management system 1000 includes the notification processing unit 213 with which the management device 200 performs notification processing based on the appropriateness of the posture of the operator OP, it is possible to more effectively cause the occurrence of inappropriate boarding and alighting by the operator OP to be recognized.

In addition, as the notification processing, the above-described notification processing unit 213 performs the notification of occurrence of the inappropriate posture when boarding and alighting, and processing of recording the occurrence of the inappropriate posture when boarding and alighting as a log.

Therefore, it is possible to more quickly cause the occurrence of inappropriate boarding and alighting by the operator OP to be recognized.

In addition, as the notification processing, the notification processing unit 213 also performs processing of recording the occurrence of the inappropriate posture when boarding and alighting as a log.

Therefore, since the occurrence of the inappropriate posture when boarding and alighting is preserved as a record, it is possible to confirmatively cause the occurrence of the inappropriate boarding and alighting to be recognized even afterwards.

In the posture estimation processing unit 212, whether or not the posture is a posture in which the operator OP is supporting the body with three or more of the four limbs is one of determination elements as the appropriateness of the posture when boarding and alighting.

Therefore, it is possible to detect the posture when boarding and alighting with the support with less than three limbs (two-point support), which is likely to occur when the operator OP boards and alights, and it is possible to more effectively make boarding and alighting appropriate.

In addition, in the posture estimation processing unit 212, the direction of the body of the operator OP is one of the determination elements as the appropriateness of the posture when boarding and alighting.

For this reason, since the appropriateness of the posture when boarding and alighting is determined based on the outward posture that is likely to occur when alighting of the operator OP, it is possible to more effectively make boarding and alighting appropriate.

Another Embodiment

Another embodiment of the present invention will be described in detail with reference to the drawings.

Figure 8:
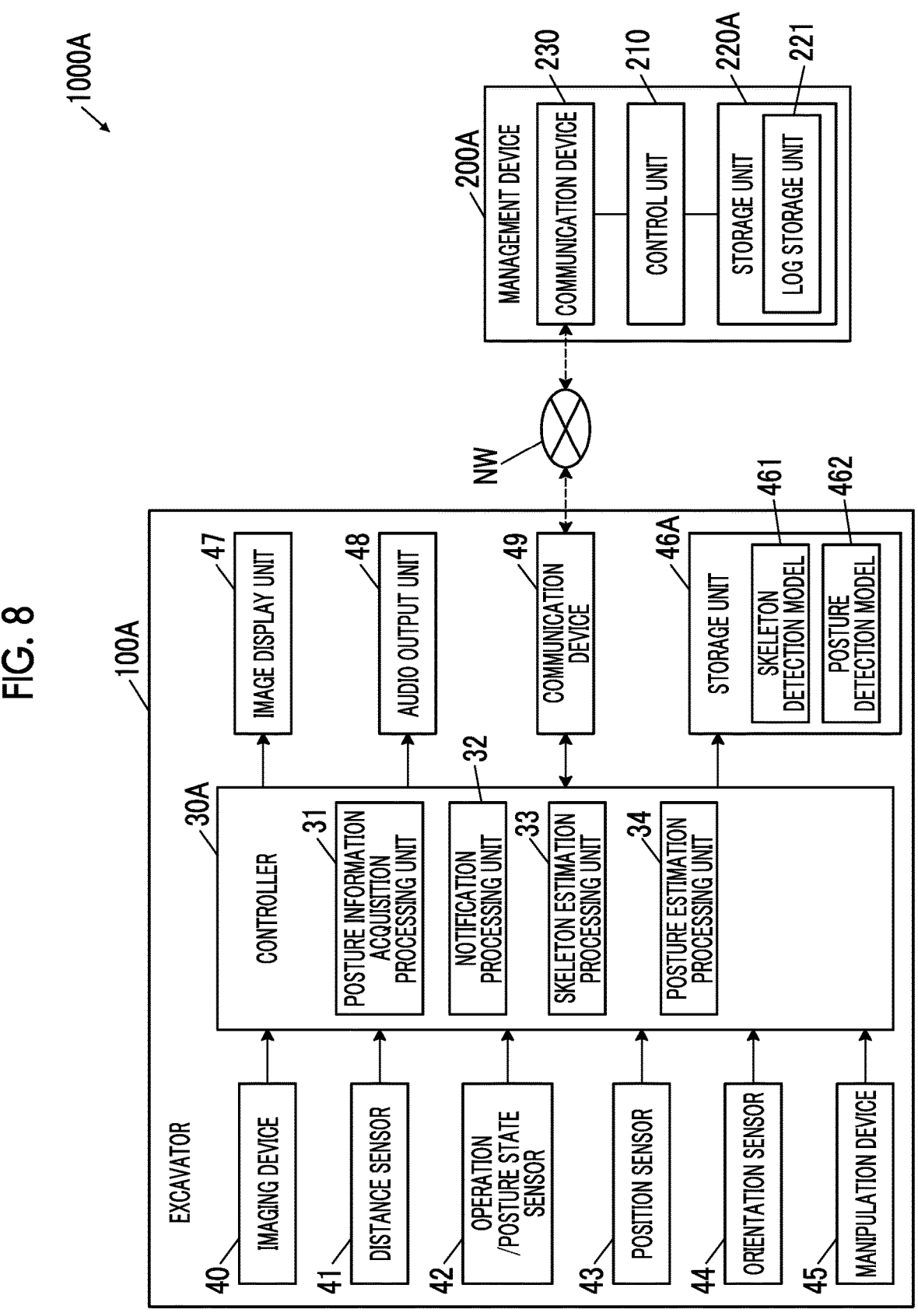
FIG. 8 is a block diagram showing a schematic configuration of a management system according to another embodiment.

FIG. 8 is a block diagram showing a schematic configuration of an excavator management system 1000A. In the present embodiment, the differences between the management system 1000A and the above-described management system 1000 will be mainly described. In addition, the same reference numerals are given to the configurations of the management system 1000A that are common to the management system 1000, and duplicate description will be omitted.

The management system 1000A is configured of an excavator 100A and a management device 200A that can communicate with each other through the network NW. In the management system 1000A, the controller 30A of the excavator 100A can perform a series of processing from acquisition of posture information of the operator OP to notification. On the other hand, the management device 200A mainly performs processing of recording a log.

The function of the controller 30A of the above-described excavator 100A is realized by any hardware, software, or a combination thereof. Furthermore, the controller 30A includes the posture information acquisition processing unit 31, a notification processing unit 32, a skeleton estimation processing unit 33, and a posture estimation processing unit 34 as functional configurations.

The skeleton estimation processing unit 33 and the posture estimation processing unit 34 perform the same processing as the skeleton estimation processing unit 211 and the posture estimation processing unit 212 of the control unit 210 of the management device 200 described above. That is, the skeleton estimation processing unit 33 and the posture estimation processing unit 34 configure a determination unit for determining the appropriateness of the posture when boarding and alighting.

In addition, the notification processing unit 32 performs the same processing as the notification processing unit 213 of the control unit 210 of the management device 200.

That is, as notification processing, the notification processing unit 32 displays a notification screen indicating the occurrence of boarding and alighting in an inappropriate posture of the operator OP on the image display unit 47 in the cabin 10, and outputs a notification sound or a notification message from the audio output unit 48.

In addition, as the notification processing, the notification processing unit 32 transmits a log, which includes the occurrence of boarding and alighting in an inappropriate posture as information, to the management device 200A through the communication network NW.

Furthermore, the excavator 100A includes a storage unit 46A that stores information such as various types of data in a writable and readable manner.

The storage unit 46A has the same skeleton detection model 461 and posture detection model 462 as the skeleton detection model 222 and the posture detection model 223 that the storage unit 220 of the management device 200 described above includes.

Processing from Acquisition of Posture Information to Notification

Figure 9:
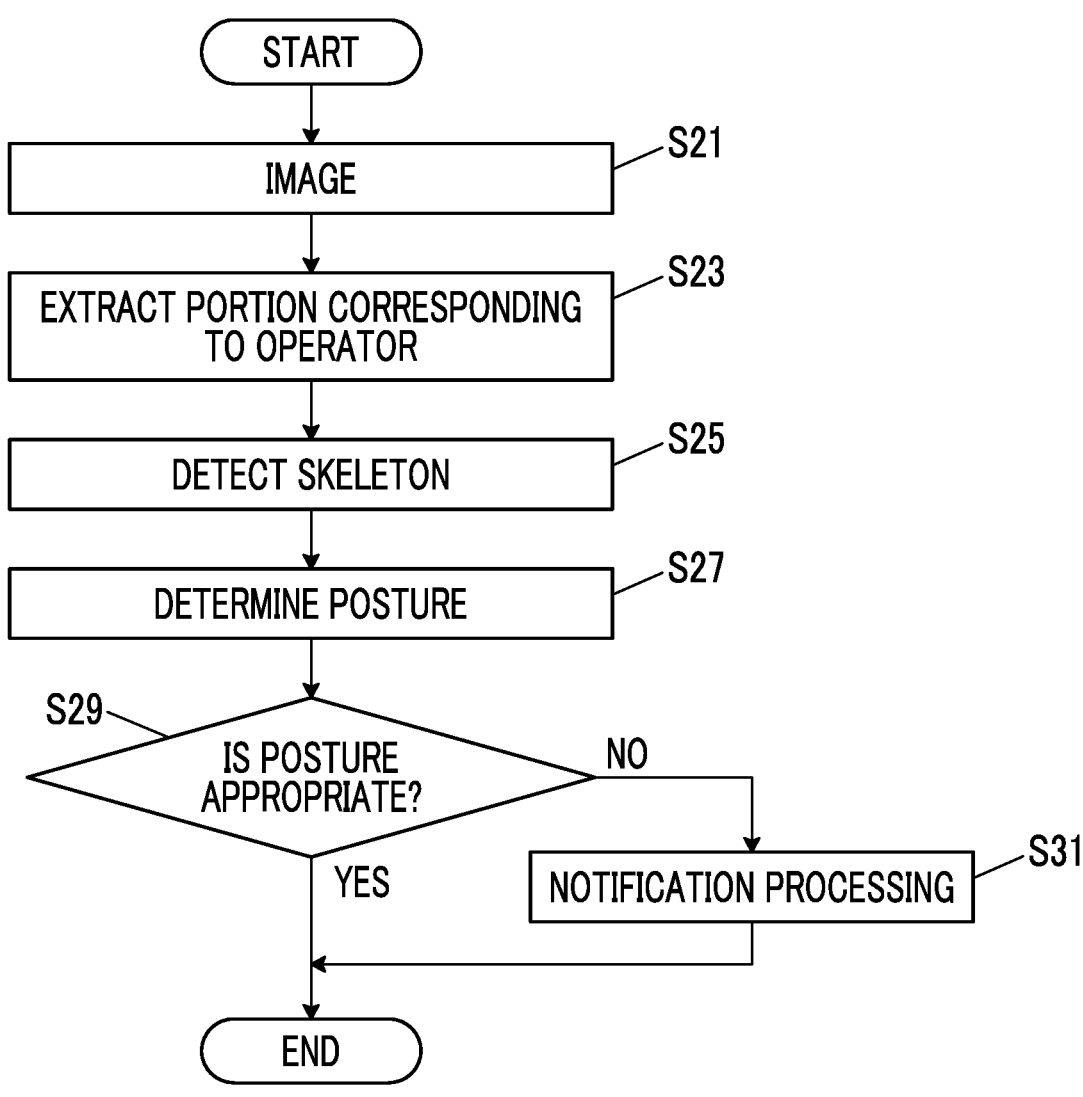
FIG. 9 is a flowchart showing a series of processing from acquisition of posture information to notification performed by a controller of an excavator.

The series of the processing from the acquisition of the posture information of the operator OP to the notification in the excavator 100A will be described. FIG. 9 is a flowchart showing the series of the processing from the acquisition of the posture information to the notification performed by the controller 30A of the excavator 100A.

First, the posture information acquisition processing unit 31 of the controller 30A of the excavator 100A images the operator OP boarding and alighting from the cabin 10 (step S21). Then, the captured image data is output to the skeleton estimation processing unit 33 as posture information.

The skeleton estimation processing unit 33 extracts a portion corresponding to the operator OP for each frame of image data of the captured image data (step S23).

Further, the data of the portion corresponding to the operator OP is input to the skeleton detection model 461, and estimated skeleton data is acquired (step S25). The acquired estimated skeleton data is input to the posture estimation processing unit 34.

The posture estimation processing unit 34 inputs the estimated skeleton data to the posture detection model 462. Then, a determination result for the "appropriate posture" is acquired (step S27). The posture estimation processing unit 34 inputs the determination result to the notification processing unit 32.

When a determination result indicating that the operator OP is in an "appropriate posture" is input from the posture estimation processing unit 34, the notification processing unit 32 ends the processing as it is (step S29).

In addition, when a determination result indicating that the operator OP is in an "inappropriate posture" is input from the posture estimation processing unit 34, the notification processing unit 32 executes the notification processing (step S31).

That is, the notification processing unit 32 displays a notification screen on the image display unit 47, and outputs a notification sound or a notification message from the audio output unit 48.

Further, the notification processing unit 32 transmits boarding and alighting in an "inappropriate posture" as a log to the management device 200A through the communication network NW.

In the management device 200A, boarding and alighting in an "inappropriate posture" is recorded as a log in the log storage unit 221 in the storage unit 220A.

The processing performed by the controller 30A shown in FIG. 9 may be sequentially performed for each frame of the captured image data, or may be performed intermittently at intervals of a predetermined number of frames.

Technical Effects of Another Embodiment

The above-described excavator 100A has the same technical effect as the management system 1000 described above in making boarding and alighting of the operator OP appropriate.

Further, in the above-described excavator 100A, the skeleton estimation processing unit 33 and the posture estimation processing unit 34 determine the appropriateness of the posture when boarding and alighting, based on the captured image data as the posture information of the operator OP acquired by the posture information acquisition processing unit 31.

In this case, since processing of transmitting the captured image data as the posture information to the management device 200A through the communication network NW is not necessary, it is possible to quickly determine the appropriateness of the posture when boarding and alighting.

Accordingly, it is possible to monitor inappropriate boarding and alighting by the operator OP, which more effectively contributes to prevention and suppression thereof.

Therefore, it is not necessary to install an elevating device for the excavator 100A, and it is possible to suppress an increase in size, complexity, weight, manufacturing cost, and the like of the excavator 100A, and make boarding and alighting appropriate.

Further, since the excavator 100A does not require processing of transmitting the captured image data to the management device 200A through the communication network NW, the notification processing unit 32 can quickly perform the notification processing.

Therefore, it is possible to notify the operator OP who has boarded and alighted in an inappropriate posture on the spot, and it is possible to more quickly cause the operator OP to recognize that the operator OP has boarded and alighted in an inappropriate posture. Therefore, the effect of suppressing boarding and alighting in an inappropriate posture again is high, and it is possible to effectively promote to make the posture when boarding and alighting appropriate.

Other

The embodiments according to the present invention have been described above. However, the present invention is not limited to the above-described embodiments and modification examples of the embodiments.

For example, a case where the notification processing unit 213 of the management device 200 and the notification processing unit 32 of the excavator 100A perform the notification processing when the operator OP boards and alights in an inappropriate posture has been exemplified, but notification may be made using an image or an audio even when boarding and alighting in an appropriate posture. In addition, boarding and alighting in an appropriate posture may be recorded as a log.

Further, the imaging device 40 of the excavators 100 and 100A is provided inside the cabin 10 and imaging of the operator OP boarding and alighting is performed from the inside of the cabin 10, but the present invention is not limited thereto. For example, the imaging device 40 may be disposed outside the cabin 10 to image the operator OP boarding and alighting from the outside of the cabin 10.

In addition, the posture information acquisition processing unit 31 may acquire the posture information of the operator OP with a sensor (contact sensor, microswitch, or the like) that is provided on a step or a handle provided for boarding and alighting from the cabin 10 and detects contact of limbs, without relying on the imaging device 40.

Accordingly, the determination units (posture estimation processing units 212 and 34) can determine the appropriateness of the posture based on whether or not the posture is a posture in which the body is supported with three or more of the four limbs, from the number of contact points of the limbs.

In addition, in one embodiment, the content in which the posture information indicating the posture when the operator OP boards and alights is used as the captured image data is exemplified. However, the present invention is not limited thereto. The posture information includes all kinds of information that are used as materials for determining the posture of the operator OP when boarding and alighting. For example, the estimated skeleton data output by the skeleton estimation processing unit 211 described above or the determination result for the posture of the operator OP output by the posture estimation processing unit 212 described above may be used as the posture information.

When the posture information is used as the estimated skeleton data, the controller 30 of the excavator 100 includes the skeleton estimation processing unit 211. Then, the posture information acquisition processing unit 31 (transmission unit) transmits the estimated skeleton data (posture information) to the management device 200 through the communication device 49.

Further, when the posture information is used as the determination result for the posture of the operator OP, the controller 30 of the excavator 100 includes the skeleton estimation processing unit 211 and the posture estimation processing unit 212. Then, the posture information acquisition processing unit 31 (transmission unit) transmits the determination result for the posture of the operator OP (posture information) to the management device 200 through the communication device 49.

In addition, although the control unit 210 of the management device 200 or the controller 30A of the excavator 100A monitors the appropriateness of the posture of the operator OP when boarding and alighting, other states of the operator OP may also be monitored.

For example, the imaging device 40 in the cabin 10 may be used for state monitoring of the operator OP in the driving seat 101 (a state of poor physical condition, a state of loss of consciousness, or the like). For these state monitoring as well, it is preferable to detect the corresponding state from the captured image by using a machine learning model to which an algorithm of a deep neural network is applied.

Further, the work machine according to an embodiment of the present invention is not limited to an excavator, and can be applied to all work machines (including a construction machine). For example, the display unit of the work machine according to an embodiment of the present invention can also be applied to a wheel loader, a bulldozer, a motor grader, a skid steer loader, a compact track loader, a self-propelled crane, or the like.

In particular, in a work machine including a rotating platform among the above-mentioned work machines, since it is difficult to install an elevating device, the present invention can be more preferably applied.

In addition, changes can be made as appropriate to the detailed parts shown in the embodiments within a range not departing from the concept of the invention.

What is claimed is:

1. A work machine management system comprising:

a work machine;

a management device configured to communicate with the work machine via a predetermined network; and one or more processors provided in at least one of the work machine and the management device, the one or more processors being configured to:

acquire posture information including image data of a driver of the work machine when boarding and alighting;

generate estimated skeleton data including detection points representing positions of parts of a body of the driver based on the acquired posture information;

determine whether a predefined safety posture condition is satisfied based on the estimated skeleton data; and perform notification processing based on the determination regarding the predefined safety posture condition, wherein the predefined safety posture condition includes at least one of a condition that the body of the driver is supported with three or more of four limbs, a condition that a direction of the body of the driver is directed toward an inside of a cabin, and a condition that a handrail provided in the cabin is grasped.

2. The work machine management system according to claim 1, wherein the notification processing performed by the one or more processors is at least any one of notification of occurrence of an inappropriate posture when boarding and alighting, processing of recording the occurrence of the inappropriate posture when boarding and alighting as a log, or processing of transmitting appropriateness information indicating appropriateness of the posture when boarding and alighting.

3. A work machine comprising:

one or more processors configured to:

acquire posture information including image data of a driver of the work machine when boarding and alighting;

generate estimated skeleton data including detection points representing positions of parts of a body of the driver based on the acquired posture information;

determine whether a predefined safety posture condition is satisfied based on the estimated skeleton data; and perform notification processing based on the determination regarding the predefined safety posture condition, wherein the predefined safety posture condition includes at least one of a condition that the body of the driver is supported with three or more of four limbs, a condition that a direction of the body of the driver is directed toward an inside of a cabin, and a condition that a handrail provided in the cabin is grasped.

* * * * *